(12) United States Patent
Wang et al.

(10) Patent No.: US 12,444,456 B2
(45) Date of Patent: Oct. 14, 2025

(54) MEMRISTOR-BASED IN-MEMORY LOGIC CIRCUIT AND IN-MEMORY LOGIC COMPUTATION SYSTEM, AND APPLICATIONS

(71) Applicants: HUAZHONG UNIVERSITY OF SCIENCE AND TECHNOLOGY, Hubei (CN); Peking University, Beijing (CN)

(72) Inventors: Chao Wang, Hubei (CN); Yuansheng Zhao, Hubei (CN); Jiarui Xu, Hubei (CN); Zongwei Wang, Beijing (CN)

(73) Assignees: HUAZHONG UNIVERSITY OF SCIENCE AND TECHNOLOGY, Hubei (CN); PEKING UNIVERSITY, Beijing (CN)

( * ) Notice: Subject to any disclaimer, the term of this patent is extended or adjusted under 35 U.S.C. 154(b) by 237 days.

(21) Appl. No.: 18/343,876

(22) Filed: Jun. 29, 2023

(65) Prior Publication Data

US 2024/0282360 A1    Aug. 22, 2024

(30) Foreign Application Priority Data

Feb. 17, 2023    (CN) .......................... 202310131821.8

(51) Int. Cl.
*G11C 11/4091* (2006.01)
*G11C 11/408* (2006.01)
*G11C 11/4096* (2006.01)

(52) U.S. Cl.
CPC ...... *G11C 11/4091* (2013.01); *G11C 11/4087* (2013.01); *G11C 11/4096* (2013.01)

(58) Field of Classification Search
CPC .................................................. G11C 11/4091
USPC .......................................................... 365/148
See application file for complete search history.

(56) References Cited

U.S. PATENT DOCUMENTS

| 9,202,561 B1* | 12/2015 | Park | G11C 7/14 |
| 2020/0311533 A1* | 10/2020 | Agrawal | G11C 13/003 |
| 2023/0176750 A1* | 6/2023 | Aoki | G11C 13/0069 |
| | | | 711/104 |
| 2023/0187013 A1* | 6/2023 | Gherman | G11C 29/52 |
| | | | 365/185.09 |

* cited by examiner

*Primary Examiner* — Anthan Tran
(74) *Attorney, Agent, or Firm* — HSML P. C.

(57) ABSTRACT

A memristor-based in-memory logic circuit and in-memory logic computation system, and applications, pertaining to the technical field of integrated circuits, are provided. The in-memory logic circuit includes: a first memory cell and a second memory cell connected in parallel to each other, and a sense amplifier for generating a logic operation result. The two memory cells include memristors and MOSFET selectors connected in series. Resistance states of the two memristors are used to represent a first group of logic input signals, and voltage signals applied by gates of the two MOSFET selectors are used to represent a second group of logic input signals. Also provided are an in-memory logic computation system and applications.

15 Claims, 3 Drawing Sheets

MEMRISTOR-BASED IN-MEMORY LOGIC CIRCUIT AND IN-MEMORY LOGIC COMPUTATION SYSTEM, AND APPLICATIONS

TECHNICAL FIELD

The present invention pertains to the technical field of integrated circuits and more specifically, relates to a memristor-based in-memory logic circuit and in-memory logic computation system, and applications.

BACKGROUND ART

Computing-in-Memory (CIM) is a computation processing method for novel edge-computing applications such as object identification, autonomous driving, artificial intelligence, big data, 5G, etc., and receives wide attention due to the potential thereof for overcoming the bottleneck of memory wall and power wall in conventional Von Neumann system. Memristor-based non-volatile logic computation is one of promising technical solutions to achieve such an CIM architecture. For a memristor, the resistance value is utilized to represent physical state variable. Under operating conditions of voltage pulses, switching between two stable resistance states, i.e., high resistance state (RHRS) and low resistance state (RLRS), can be achieved. For the memristor, the high resistance state corresponds to logic "0", and the low resistance state corresponds to logic "1".

Current memristor-based logic computation solutions are mainly divided into two categories, i.e., stateful logic circuit and a CMOS-memristor hybrid logic. In the memristor-based stateful logic gates, the logic input and output are represented by high and low resistance states of the memristors, and operational voltage pulses are applied to conditionally change the resistance state of the memristors to achieve logic operation. The stateful logic circuits mainly include two categories, i.e., material implication (IMPLY) logic style and memristor-aided logic (MAGIC) style. In CMOS-memristor hybrid logic gates, the logic input and output are represented by high and low voltage potentials of CMOS-aided circuits or some auxiliary MOSFETs. Logic computation is achieved by configuring voltage ratio of the memristors' RHRS and RLRS in the CMOS-memristor hybrid logic gates.

However, a computation process of memristor-based stateful logic gats require repeated programming of memristors, so that the lifetime and reliability of memristors are affected, and computation efficiency significantly decreases when the logic cascade increases for complicated computing tasks. For the MAGIC style circuit, memristors' serial and parallel connection design needs to be performed for different logic gates, thereby increasing design complexity. The IMPLY style circuit needs additional resistors overhead, and the logic output of IMPLY circuit would overwrite input memristors, thereby failing to meet the requirements of protecting input weights in neural network applications. The CMOS-memristor hybrid logic circuit changes the original structure of a memristor array, so that large-scale integration cannot be achieved effectively.

SUMMARY OF THE INVENTION

In view of the challenges and improvement requirements in the prior art, provided in the present invention are a memristor-based in-memory logic circuit and in-memory logic computation system, and applications, called Pass-Transistor-Memristor Logic (PTM Logic). The objective of the present invention is to design a logic operation circuit having a simple structure, compatible to standard memristor array, and capable of achieving non-destructive logic operation, and apply the same to a large-scale integrated circuit to reduce overhead of peripheral auxiliary computation elements, improve the reliability of a memristor memory and computation system, and reduce complexity.

In order to achieve the above objective, according to a first aspect of the present invention, provided is a memristor-based in-memory logic circuit, comprising:

a first memory cell and a second memory cell connected in parallel to each other, and a sense amplifier, the first memory cell comprising a first memristor and a first MOSFET selector connected in series, the second memory cell comprising a second memristor and a second MOSFET selector connected in series, respective terminals of the first memristor and the second memristor being grounded, parallel-connection terminals of the first MOSFET selector and the second MOSFET selector being connected to a first input terminal of the sense amplifier, a second input terminal of the sense amplifier being connected to a reference signal, positive-phase and negative-phase output voltage signals of the sense amplifier being the logic operation results, resistance states of the first memristor and the second memristor representing a first group of logic input signals, and voltage signals applied by the gates of the first MOSFET selector and the second MOSFET selector representing a second group of logic input signals.

Further, a first input signal A is used to represent the resistance state $Din_1(A)$ of the first memristor, and an inversion signal $\overline{A}$ of the first input signal A is used as the resistance state $Din_1'(\overline{A})$ of the second memristor, a second input signal B being used to represent the voltage signal $Din_2'(B)$ applied by the gate of the second MOSFET selector, an inversion signal $\overline{B}$ of the second input signal B being used as the potential signal $Din_2(\overline{B})$ applied by the gate of the first MOSFET selector, and the sense amplifier generating "XOR" and "XNOR" logic operation results.

Further, a first input signal A is used to represent the resistance state $Din_1(A)$ of the first memristor, and the resistance state of the second memristor is set to a low resistance state $Din_1'(1)$, a second input signal B being used to represent the voltage signal $Din_2'(B)$ applied by the gate of the second MOSFET selector, an inversion signal $\overline{B}$ of the second input signal B being used as the voltage signal $Din_2(\overline{B})$ applied by the gate of the first MOSFET selector, and the sense amplifier generating "OR" and "NOR" logic operation results.

Further, a first input signal A is used to represent the resistance state $Din_1(A)$ of the first memristor, and an inversion signal $\overline{A}$ of the first input signal A is used as the resistance state $Din_1'(\overline{A})$ of the second memristor, a second input signal B being used to represent the voltage signal $Din_2'(B)$ applied by the gate of the second MOSFET selector, a voltage signal applied by the gate of the first MOSFET selector being set to a high level $Din_2(1)$, and the sense amplifier generating "OR" and "NOR" logic operation results.

Further, a first input signal A is used to represent the resistance state $Din_1'(A)$ of the second memristor, and the resistance state of the first memristor is set to a high resistance state $Din_1(0)$, a second input signal B being used to represent the potential signal $Din_2'(B)$ applied by the gate of the second MOSFET selector, an inversion signal $\overline{B}$ of the second input signal B being used as the potential signal $Din_2(\overline{B})$ applied by the gate of the first MOSFET selector, and the sense amplifier generating "AND" and "NAND" logic operation results.

Further, a first input signal A is used to represent the resistance state $Din_1(A)$ of the first memristor, and an inversion signal $\overline{A}$ of the first input signal A is used as the resistance state $Din_1'(\overline{A})$ of the second memristor, a second input signal B being used to represent the voltage signal $Din_2(B)$ applied by the gate of the first MOSFET selector, the voltage signal applied by the gate of the second MOSFET selector being set to a low level $Din_2'(0)$, and the sense amplifier generating "AND" and "NAND" logic operation results.

According to a second aspect of the present invention, provided is a memristor-based in-memory logic computation system, comprising at least one PTM Logic circuit according to any item of the first aspect.

Further, the in-memory logic computation system further comprises: a Word-Line (WL) decoder and drivers, a Source-Line (SL) decoder, selector, and drivers, a Bit-Line decoder, selectors, and drivers, and a system controller, Memristor-based Computing-in-Memory (CIM) cells forming an array structure, respective terminals of memristor CIM cells in the same column being connected to the BL decoder, selectors and drivers by means of a Bit-Line, respective other terminals being connected to the SL decoder, selectors, and drivers by means of a Source-Line, and being connected to the first input terminal of the sense amplifier by means of the SL decoder, selectors, and drivers, and memristor CIM cells in the same row being connected to the WL decoder and driver by means of a Word-Line, wherein the memristor CIM cell is the first memory cell and the second memory cell connected in parallel to each other, the system controller respectively controlling the WL decoder and drivers, the SL decoder, selectors, and drivers and the BL decoder, selectors and drivers.

Further, the array structure formed by the memristor CIM cells is a two-transistor two-memristor (2T2R) array structure, or an array structure formed by parallel connection of two sets each comprising one transistor and one memristor (1T1R).

According to a third aspect of the present invention, provided is a CIM hardware accelerator for neural network applications, for protecting weight data from destruction in the neural network, comprising the in-memory logic computation system according to any item of the second aspect.

In general, the above technical solutions proposed in the present invention can achieve the following beneficial effects:

(1) In the present invention, a novel memristor-based in-memory logic circuit is design by means of two memory cells connected in parallel to each other (each memory cell comprises one memristor and one MOSFET selector connected in series) and a sense amplifier, and the in-memory logic circuit has a simple structure.

During computation, resistance states of the two memristors are used to represent a first group of input signals, and voltage signals of gates of the two MOSFET selectors represent a second group of input signals. In a logic computation process, the resistance states of the two memristors are unchanged, so that non-destructive logic computation can be achieved, thereby facilitating large-scale integration.

(2) Further, the in-memory logic circuit designed in the present invention has a programmable logic function, can implement different logic operations, and is applicable to a complex logic operation system. In addition, by means of configuration in resistance states of two memristors and configuration in voltage signals of gates of two MOSFET selectors, logic computation of "XOR/XNOR", "OR/NOR", and "AND/NAND" are implemented, so that different logic functions can be easily implemented in the same type of circuit structure without the need of changing serial and parallel connection relationships of memristors, thereby reducing design and application complexity. Meanwhile, device aging that is caused by frequent programming performed on memristors and affects the reliability of memristor-based CIM system is prevented.

(3) Further, on the basis of the in-memory logic circuit designed in the present invention, provided is a memristor-based in-memory logic computation system. Additional auxiliary computation elements other than peripheral circuits necessary to a memory array do not need to be introduced into the in-memory logic computation system, thereby reducing overhead of peripheral auxiliary computation elements, improving the reliability of the computation system, and improving the compatibility between an in-memory logic circuit and a memristor array structure. Therefore, the computation system has a simple structure.

(4) Preferably, the memristor CIM cell in the memristor-based in-memory logic computation system of the present invention may be a two-transistor two-memristor (2T2R) logic computation cell and memristor array structure, or may be a structure formed by parallel connection of two sets each comprising one transistor and one memristor (1T1R). The formed array structure has a flexible form, and is easy to use.

(5) Further, the in-memory logic computation system provided in the present invention can be applied to a neural network, and an input weight is represented by a resistance state of a memristor in a memristor array. During computation, the resistance state of the memristor does not change, thereby meeting the requirement that weight data of the neural network is not destructed.

In summary, the memristor-based in-memory logic circuit of the present invention, i.e., Pass-Transistor-Memristor (PTM) logic, has a simple structure, and can implement non-destructive logic computation. Applying the in-memory logic circuit to an in-memory logic computation system can prevent device aging caused by frequent programming performed on memristors from affecting the reliability of a memristor computation system, and can ensure that a logic operation cell is programmable while improving compatibility between a logic computation cell and a memristor array.

BRIEF DESCRIPTION OF THE DRAWINGS

In all the accompanying drawings, the same reference numerals are used to refer to the same elements and structures, wherein.

1 is a first memory cell. 11 is a first memristor. 12 is a first MOSFET selector. 2 is a second memory cell. 21 is a second memristor. 22 is a second MOSFET selector. 3 is a sense amplifier.

DETAILED DESCRIPTION

To make the purpose, technical solution, and advantages of the present invention clearer, the present invention is further described in detail below in connection with the accompanying drawings and embodiments. It should be appreciated that the specific embodiments described here are used merely to explain the present invention and are not used to define the present invention. In addition, the technical features involved in various embodiments of the present invention described below can be combined with each other as long as they do not constitute a conflict therebetween.

In the present invention, the terms "first," "second," and the like in the present invention and the accompanying drawings are used to distinguish similar objects, but are not necessarily used to describe a specific sequence or order.

Figure 1A:
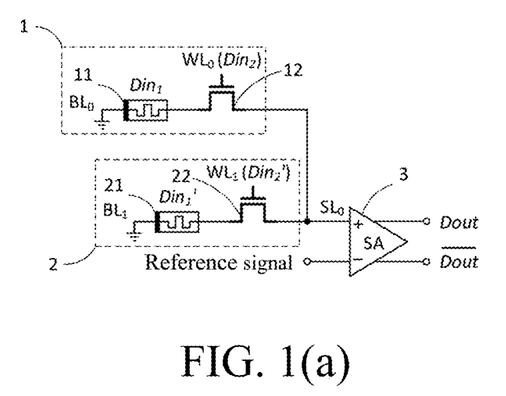
FIG. 1(a) is a topology of in-memory logic circuit provided in the present invention.

As shown in FIG. 1(a), a memristor-based in-memory logic circuit of the present invention mainly includes: a first memory cell 1 and a second memory cell 2 connected in parallel to each other, and a CMOS sense amplifier 3 for generating a logic operation result. The first memory cell 1 includes a first memristor 11 and a first MOSFET selector 12 connected in series. The second memory cell 2 includes a second memristor 21 and a second MOSFET selector 22 connected in series. One terminal $BL_0$ of the first memristor 11 is grounded, and the other terminal is connected in series to the first MOSFET selector 12. One terminal $BL_1$ of the second memristor 21 is grounded, and the other terminal is connected in series to the second MOSFET selector 22. Parallel-connection terminals $SL_0$ of the first MOSFET selector 12 and the second MOSFET selector 22 are connected to a first input terminal of the sense amplifier 3. A second input terminal of the sense amplifier 3 is connected to a reference signal. Amplitude comparison between a signal received by the first input terminal of the sense amplifier 3 and the reference signal of the second input terminal is performed. Positive-phase and negative-phase output voltage signals of the sense amplifier 3 are a logic operation result.

Specifically, when the amplitude of the signal received by the first input terminal of the sense amplifier is larger than the amplitude of the reference signal of the second input terminal of the sense amplifier, a positive-phase output terminal of the sense amplifier outputs a high voltage signal (i.e., VDD) and a negative-phase output terminal outputs a low voltage signal (i.e., GND). When the amplitude of the signal received by the first input terminal of the sense amplifier is lower than the amplitude of the reference signal of the second input terminal of the sense amplifier, the positive-phase output terminal of the sense amplifier outputs a low voltage signal, and the negative-phase output terminal outputs a high voltage signal.

Figure 1B:
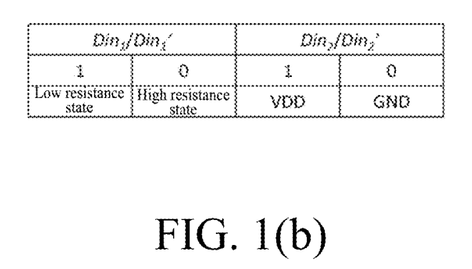
FIG. 1(b) is a schematic diagram of a corresponding input signal setting.

The memristor-based in-memory logic circuit of the present invention includes two groups of logic input signals. As shown in FIG. 1(b), a first group of logic input signals ($Din_1$, $Din_1'$) are represented by resistance states of the first memristor 11 and the second memristor 21. Logic "0" is indicated when the first memristor or the second memristor is in the high resistance state, and logic "1" is indicated when the first memristor or the second memristor is in the low resistance state. A second group of logic input signals ($Din_2$, $Din_2'$) are represented by voltage signals of gates of the first MOSFET selector 12 and the second MOSFET selector 22. Logic "1" is indicated when the voltage signal of a terminal $WL_0$ of the first MOSFET selector 12 or the voltage signal of a terminal $WL_1$ of the second MOSFET selector 22 is at a high level, i.e., VDD, and logic "0" is indicated when the potential signal is at a low level, i.e., GND.

The first memristor or the second memristor in the present invention includes a two-terminal resistive memory such as a Resistive Random-Access-Memory (RRAM), a Phase-change Random-Access-Memory (PRAM), a Magnetic Random-Access-Memory (MRAM), or the like.

A memristor in-memory logic circuit provided in the present invention will be described below in detail with reference to FIG. 1(a) and FIG. 1(b) in conjunction with FIG. 2(a), FIG. 2(b) to FIG. 6(a), and FIG. 6(b).

Embodiment 1

Figure 2A:
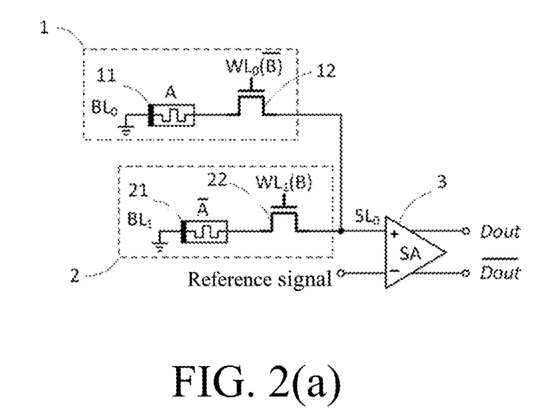
FIG. 2(a) is a schematic topology illustrating that a memristor in-memory logic circuit provided in Embodiment 1 of the present invention implements a logic "XOR/XNOR" operation.
Figure 2B:
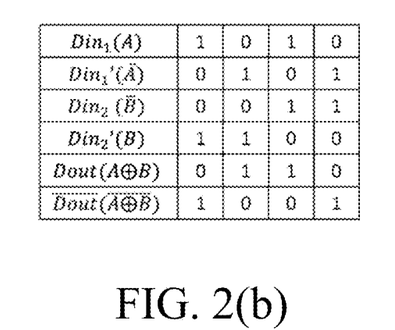
FIG. 2(b) is a corresponding truth table.

As shown in FIG. 2(a) and FIG. 2(b), on the basis of the above memristor-based in-memory logic circuit, a method for implementing an "XOR/XNOR" logic operation comprises:

using a first input signal A to represent the resistance state $Din_1$ (A) of the first memristor 11, and using an inversion signal $\overline{A}$ of the first input signal A as the resistance state $Din_1'(\overline{A})$ of the second memristor 21 using a second input signal B to represent the voltage signal $Din_2'(B)$ applied by the gate terminal $WL_1$ of the second MOSFET selector 22, and using an inversion signal $\overline{B}$ of the second input signal B as the voltage signal $Din_2(\overline{B})$ applied by the gate terminal $WL_0$ of the first MOSFET selector 12; and performing amplitude comparison between a signal received by the first input terminal of the sense amplifier 3 and the reference signal of the second input terminal, and generating "XOR" and "XNOR" logic output voltage signals having phases opposite to each other, wherein $Dout(A \oplus B)$ represents an "XOR" logic operation result output by the sense amplifier 3, and $\overline{Dout(A \oplus B)}$ represents an "XNOR" logic operation result.

Embodiment 2

Figure 3A:
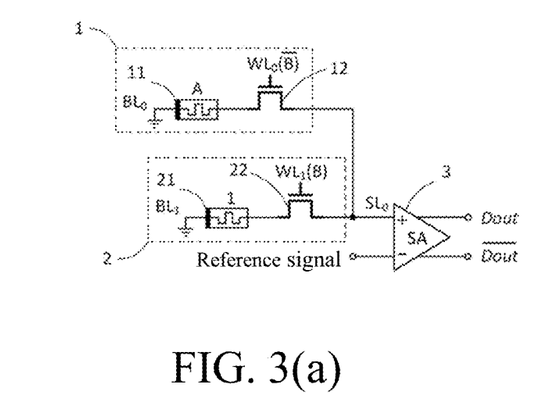
FIG. 3(a) is a schematic topology illustrating that a memristor in-memory logic circuit provided in Embodiment 2 of the present invention implements the first kind of logic "OR/NOR" operations.
Figure 3B:
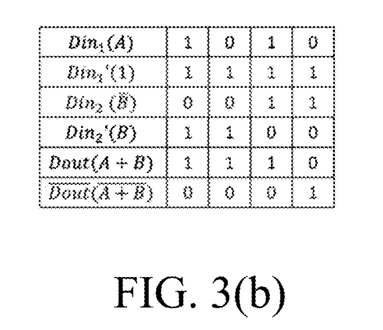
FIG. 3(b) is a corresponding truth table.

As shown in FIG. 3(*a*) and FIG. 3(*b*), on the basis of the above memristor-based in-memory logic circuit, a method for implementing the first kind of "OR/NOR" logic operations comprises:

using a first input signal A to represent the resistance state $Din_1$ (A) of the first memristor 11, and setting the resistance state of the second memristor 21 to a low resistance state $Din_1'(1)$;

using a second input signal B to represent the voltage signal $Din_2'(B)$ applied by the gate terminal $WL_1$ of the second MOSFET selector 22, and using an inversion signal B of the second input signal B as the voltage signal $Din_2(B)$ applied by the gate terminal $WL_0$ of the first MOSFET selector 12; and performing amplitude comparison between a signal received by the first input terminal of the sense amplifier 3 and the reference signal of the second input terminal, and generating "OR" and "NOR" logic output voltage signals having phases opposite to each other, wherein $Dout(A+B)$ represents an "OR" logic operation result output by the sense amplifier 3, and $\overline{Dout(A+B)}$ represents a "NOR" logic operation result.

Embodiment 3

Figure 4A:
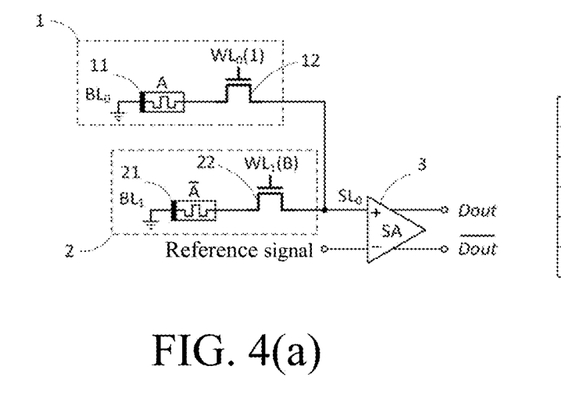
FIG. 4(a) is a schematic topology illustrating that a memristor in-memory logic circuit provided in Embodiment 3 of the present invention implements the second kind of logic "OR/NOR" operation.
Figure 4B:
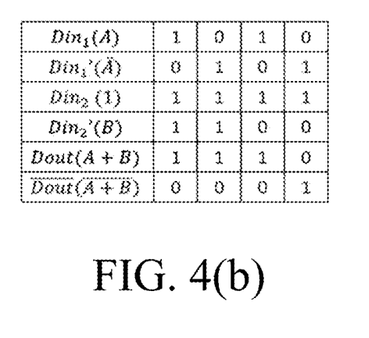
FIG. 4(b) is a corresponding truth table.

As shown in FIG. 4(*a*) and FIG. 4(*b*), on the basis of the above memristor-based in-memory logic circuit, a method for implementing the second kind of "OR/NOR" logic operations comprises:

using a first input signal A to represent the resistance state $Din_1$ (A) of the first memristor 11, and using an inversion signal $\overline{A}$ of the first input signal A as the resistance state $Din_1'(\overline{A})$ of the second memristor 21;

using a second input signal B to represent the voltage signal $Din_2'(B)$ applied by the gate terminal $WL_1$ of the second MOSFET selector 22, and setting the voltage signal applied by the gate terminal $WL_0$ of the first MOSFET selector 12 to a high level $Din_2(1)$; and performing amplitude comparison between a signal received by the first input terminal of the sense amplifier 3 and the reference signal of the second input terminal, and generating "OR" and "NOR" logic output voltage signals having phases opposite to each other, wherein $Dout(A+B)$ represents an "OR" logic operation result output by the sense amplifier 3, and $\overline{Dout(A+B)}$ represents a "NOR" logic operation result.

Embodiment 4

Figure 5A:
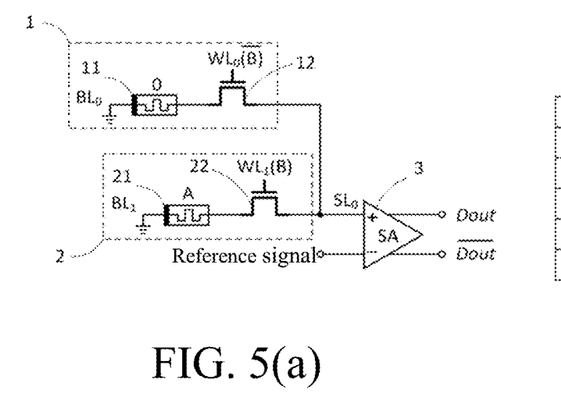
FIG. 5(a) is a schematic topology illustrating that a memristor in-memory logic circuit provided in Embodiment 4 of the present invention implements the first kind of logic "AND/NAND" operations.
Figure 5B:
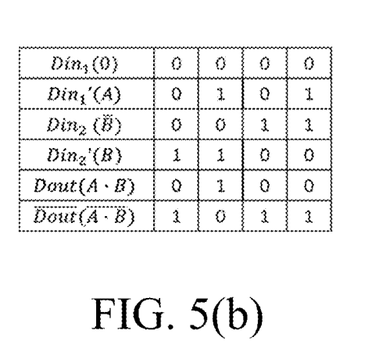
FIG. 5(b) is a corresponding truth table.

As shown in FIG. 5(*a*) and FIG. 5(*b*), on the basis of the above memristor-based in-memory logic circuit, a method for implementing the first kind of "AND/NAND" logic operations comprises:

using a first input signal A to represent the resistance state $Din_1'(A)$ of the second memristor 21, and setting the resistance state of the first memristor 11 to a high resistance state $Din_1(0)$;

using a second input signal B to represent the voltage signal $Din_2'(B)$ applied by the gate terminal $WL_1$ of the second MOSFET selector 22, and using an inversion signal $\overline{B}$ of the second input signal B as the potential signal $Din_2(\overline{B})$ applied by the gate terminal $WL_0$ of the first MOSFET selector 12; and performing amplitude comparison between a signal received by the first input terminal of the sense amplifier 3 and the reference signal of the second input terminal, and generating "AND" and "NAND" logic output potential signals having phases opposite to each other, wherein $Dout(A \cdot B)$ represents an "AND" logic operation result output by the sense amplifier 3, and $\overline{Dout(A \cdot B)}$ represents a "NAND" logic operation result.

Embodiment 5

Figure 6A:
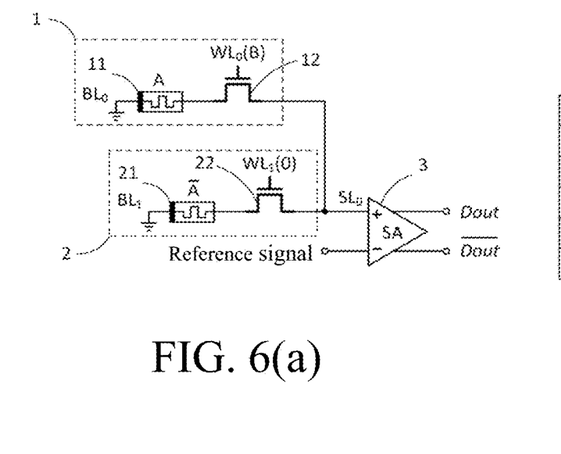
FIG. 6(a) is a schematic topology illustrating that a memristor in-memory logic circuit provided in Embodiment 5 of the present invention implements the second kind of logic "AND/NAND" operations.
Figure 6B:
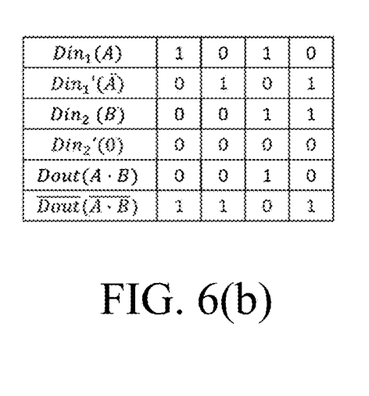
FIG. 6(b) is a corresponding truth table.

As shown in FIG. 6(*a*) and FIG. 6(*b*), on the basis of the above memristor-based in-memory logic circuit, a method for implementing the second kind of "AND/NAND" logic operations comprises:

using a first input signal A to represent the resistance state $Din_1(A)$ of the first memristor 11, and using an inversion signal $\overline{A}$ of the first input signal A as the resistance state $Din_1'(\overline{A})$ of the second memristor 21;

using a second input signal B to represent the voltage signal $Din_2(B)$ applied by the gate terminal $WL_0$ of the first MOSFET selector 12, and setting the voltage signal applied by the gate terminal $WL_1$ of the second MOSFET selector 22 to a low level $Din_2'(0)$; and performing amplitude comparison between a signal received by the first input terminal of the sense amplifier 3 and the reference signal of the second input terminal, and generating "AND" and "NAND" logic output potential signals having phases opposite to each other, wherein $Dout(A \cdot B)$ represents an "AND" logic operation result output by the sense amplifier 3, and $\overline{Dout(A \cdot B)}$ represents a "NAND" logic operation result.

When the first input signal A causes $Din_1(A)$ or $Din_1'(A)$ to be a low resistance state, the logic input "1" is indicated. When the first input signal A causes $Din_1(A)$ or $Din_1'(A)$ to be a high resistance state, the logic input "0" is indicated, and resistance states of $Din_1(A)$ and $Din_1'(\overline{A})$ are opposite to each other. When the second input signal B causes $Din_2(B)$ or $Din_2'(B)$ to be at a high level, i.e., VDD, the logic input "1" is indicated. When the second input signal B causes $Din_2(B)$ or $Din_2'(B)$ to be at a low level, i.e., GND, the logic input "0" is indicated, and potential signals of $Din_2'(B)$ and $Din_2(B)$ are opposite to each other.

Embodiment 6

Figure 7:
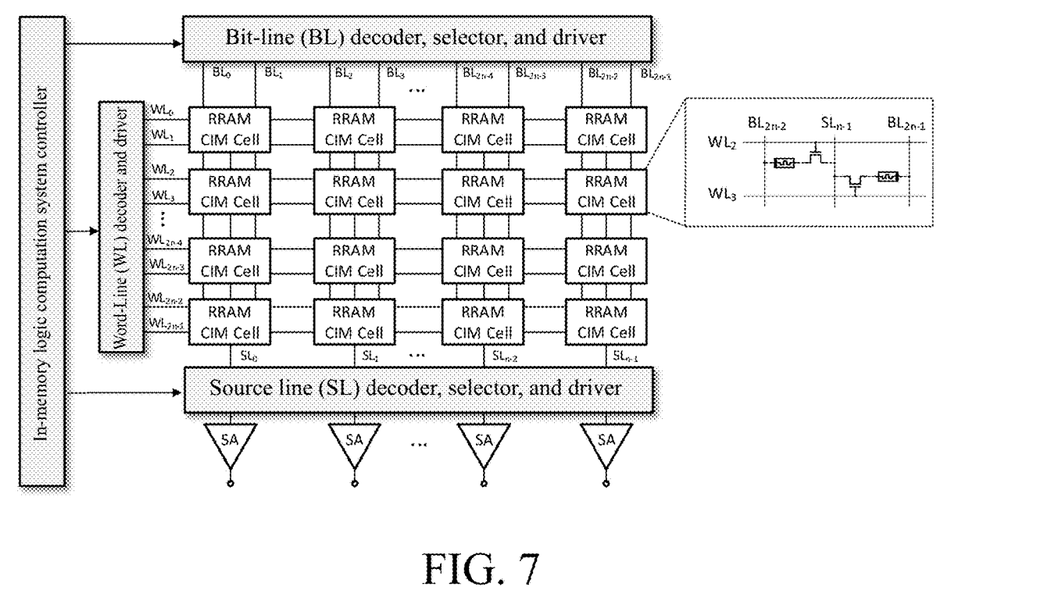
FIG. 7 is a schematic structural view of a memristor array (2T2R) based in-memory logic computation system provided in Embodiment 6 of the present invention.

As shown in FIG. 7, on the basis of the above memristor-based in-memory logic circuit, further provided in the present invention is a memristor-based in-memory logic computation system, mainly including: at least one memristor-based computing-in-memory (CIM) cell (RRAM CIM cell), a sense amplifier (SA), a Word-Line (WL) decoder and driver circuit, a Source-Line (SL) decoder, selectors, and driver circuits, a Bit-Line (BL) decoder, selectors, and driver circuits, and an in-memory logic computation system controller.

Memristor-based CIM cells form an array structure. Respective terminals of memristor-based CIM cells in the same column are connected to the source line (SL) decoder, selectors, and driver circuits by means of a SL, and are connected to the first input terminal of the sense amplifier 3 by means of the source line (SL) decoder, selectors, and driver circuits. Respective other terminals of the memristor CIM cells in the same column are connected to the bit line (BL) decoder, selectors, and driver circuits by means of a BL. Memristor-based CIM cells in the same row are connected to the WL decoder and driver circuit by means of a WL. The memristor-based decoder, selectors, and driver circuits cell is the first memory cell 1 and the second memory cell 2 connected in parallel to each other.

The in-memory logic computation system controller respectively controls the WL decoder and driver circuits, the SL decoder, selectors, and driver circuits, and the BL decoder, selectors, and driver circuits.

The memristor-based decoder, selectors, and driver circuits cell may be a two-transistor two-memristor (2T2R) logic computation cell and memristor array structure, or may be a structure formed by parallel connection of two sets each including one transistor and one memristor (1T1R), or a memristor array structure in another form.

Figure 8:
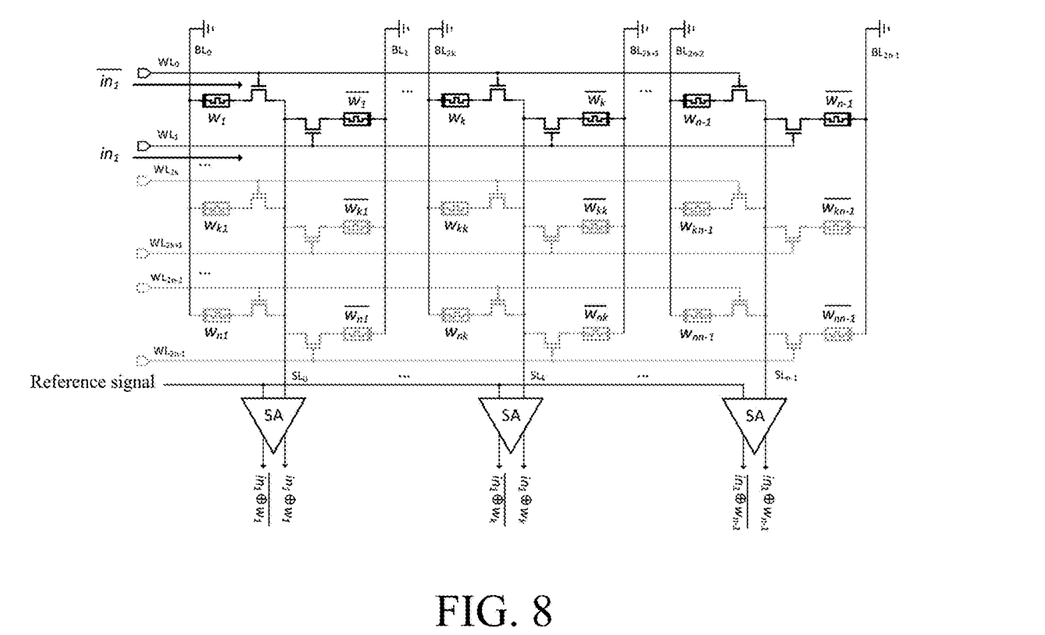
FIG. 8 is a schematic topology illustrating weight non-destructive parallel operations performed by a memristor in-memory logic circuit provided in Embodiment 6 of the present invention in a memristor array, wherein application of input vectors and weight vectors in "XOR/XNOR" operations in a neural network application is used as an example.

Specifically, shown in FIG. 8 as an example, in which bit-multiplication of input vectors and weight vectors are applied through "XOR/XNOR" operations performed in a neural network convolution computation application, is used to illustrate that the memristor-based in-memory logic computation system provided in the present invention can implement weight non-destructive "XOR/XNOR" parallel operations compatible with a memristor array.

Different combinations of positive-phase and negative-phase weight vectors in a neural network are represented by resistance states of memristors in a memristor array (i.e., $w_1$, $\overline{w_1}$, etc., in FIG. 8). A combination of positive-phase and negative-phase input vectors is represented by potential signals (i.e., $in_1$ and $\overline{in_1}$ in FIG. 8) of WLs (i.e., $WL_0$, $WL_1$, etc., in FIG. 8) in the memristor array. In-memory logic computation cells located at the same WL can perform "XOR" and "XNOR" logic operations in parallel. Logic operation output voltage signals (i.e., $in_1 \oplus w_1$, $\overline{in_1 \oplus w_1}$, etc., in FIG. 8) are generated by the sense amplifier (SA) on SLs (i.e., $SL_0$, $SL_k$, etc., in FIG. 8) in the memristor array, and weight vector data (i.e., $w_1$, $\overline{w_1}$, etc., in FIG. 8) is protected from being destructed. That is, during computation, the resistance state of the memristor does not change, so that frequent programming is not required for the memristors, resulting in high reliability.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A memristor-based in-memory logic circuit, comprising: a first memory cell and a second memory cell connected in parallel to each other, and a sense amplifier,
the first memory cell comprising a first memristor and a first MOSFET selector connected in series, the second memory cell comprising a second memristor and a second MOSFET selector connected in series, respective terminals of the first memristor and the second memristor being grounded, parallel-connection terminals of the first MOSFET selector and the second MOSFET selector being connected to a first input terminal of the sense amplifier, a second input terminal of the sense amplifier being connected to a reference signal, positive-phase and negative-phase output voltage signals of the sense amplifier being a logic operation result,
resistance states of the first memristor and the second memristor representing a first group of logic input signals, and voltage signals applied by gates of the first MOSFET selector and the second MOSFET selector representing a second group of logic input signals,
wherein a first input signal A is used to represent the resistance state $Din_1(A)$ of the first memristor, and an inversion signal $\overline{A}$ of the first input signal A is used as the resistance state $Din_1'(\overline{A})$ of the second memristor, a second input signal B being used to represent the voltage signal $Din_2'(B)$ applied by the gate of the second MOSFET selector, an inversion signal $\overline{B}$ of the second input signal B being used as the voltage signal $Din_2(\overline{B})$ applied by the gate of the first MOSFET selector, and the sense amplifier generating "XOR" and "XNOR" logic operation results.

2. A memristor-based in-memory logic computation system, comprising at least one in-memory logic circuit according to claim 1.

3. The in-memory logic computation system according to claim 2, further comprising: a Word-Line decoder and driver circuit, a Source-Line decoder, selectors, and driver circuits, a Bit-Line decoder, selectors, and driver circuits, and a system controller,
Memristor-based Computing-in-Memory cells forming an array structure, respective terminals of memristor-based Computing-in-Memory cells in the same column being connected to the Bit-Line decoder, selectors, and driver circuits by means of a Bit-Line, respective other terminals being connected to the Source-Line decoder, selectors, and driver circuits by means of a Source-Line, and being connected to the first input terminal of the sense amplifier by means of the Source-Line decoder, selectors, and driver circuits, and memristor-based Computing-in-Memory cells in the same row being connected to the Word-Line decoder and driver circuit by means of a word-line, wherein the memristor-based computing-in-memory cell is the first memory cell and the second memory cell connected in parallel to each other,
the system controller respectively controlling the Word-Line decoder and driver circuit, the Source-Line decoder, selectors, and driver circuits, and the Bit-Line decoder, selectors, and driver circuits.

4. The in-memory logic computation system according to claim 3, wherein the array structure formed by the memristor-based Computing-in-Memory cells is a two-transistor two-memristor (2T2R) array structure, or an array structure formed by parallel connection of two sets each comprising one transistor and one memristor (1T1R).

5. A Computing-in-Memory hardware accelerator for a neural network application, for protecting weight data in the neural network, comprising the in-memory logic computation system according to claim 2.

6. A memristor-based in-memory logic circuit, comprising: a first memory cell and a second memory cell connected in parallel to each other, and a sense amplifier, the first memory cell comprising a first memristor and a first MOSFET selector connected in series, the second memory cell comprising a second memristor and a second MOSFET selector connected in series, respective terminals of the first memristor and the second memristor being grounded, parallel-connection terminals of the first MOSFET selector and the second MOSFET selector being connected to a first input terminal of the sense amplifier, a second input terminal of the sense amplifier being connected to a reference signal, positive-phase and negative-phase output voltage signals of the sense amplifier being a logic operation result, resistance states of the first memristor and the second memristor representing a first group of logic input signals, and voltage signals applied by gates of the first MOSFET selector and the second MOSFET selector representing a second group of logic input signals, wherein a first input signal A is used to represent the resistance state $Din_1(A)$ of the first memristor, and the resistance state of the second memristor is set to a low resistance state $Din_1'$; a second input signal B being used to represent the voltage signal $Din_2'(B)$ applied by the gate of the second MOSFET selector, an inversion signal $\overline{B}$ of the second input signal B being used as the voltage signal $Din_2(\overline{B})$ applied by the gate of the first MOSFET selector; and the sense amplifier generating "OR" and "NOR" logic operation results, or wherein the first input signal A is used to represent the resistance state $Din_1(A)$ of the second memristor, and the resistance state of the first memristor is set to a high resistance state $Din_1(0)$; the second input signal B being used to represent the voltage signal $Din_2'(B)$ applied by the gate of the second MOSFET selector, the inversion signal $\overline{B}$ of the second input signal B being used as the voltage signal $Din_2(\overline{B})$ applied by the gate of the first MOSFET selector; and the sense amplifier generating "AND" and "NAND" logic operation results.

7. A memristor-based in-memory logic computation system, comprising at least one in-memory logic circuit according to claim 6.

8. The in-memory logic computation system according to claim 7, further comprising: a Word-Line decoder and driver circuit, a Source-Line decoder, selectors, and driver circuits, a Bit-Line decoder, selectors, and driver circuits, and a system controller, Memristor-based Computing-in-Memory cells forming an array structure, respective terminals of memristor-based Computing-in-Memory cells in the same column being connected to the Bit-Line decoder, selectors, and driver circuits by means of a Bit-Line, respective other terminals being connected to the Source-Line decoder, selectors, and driver circuits by means of a Source-Line, and being connected to the first input terminal of the sense amplifier by means of the Source-Line decoder, selectors, and driver circuits, and memristor-based Computing-in-Memory cells in the same row being connected to the Word-Line decoder and driver circuit by means of a word-line, wherein the memristor-based computing-in-memory cell is the first memory cell and the second memory cell connected in parallel to each other, the system controller respectively controlling the Word-Line decoder and driver circuit, the Source-Line decoder, selectors, and driver circuits, and the Bit-Line decoder, selectors, and driver circuits.

9. The in-memory logic computation system according to claim 8, wherein the array structure formed by the memristor-based Computing-in-Memory cells is a two-transistor two-memristor (2T2R) array structure, or an array structure formed by parallel connection of two sets each comprising one transistor and one memristor (1T1R).

10. A Computing-in-Memory hardware accelerator for a neural network application, for protecting weight data in the neural network, comprising the in-memory logic computation system according to claim 7.

11. A memristor-based in-memory logic circuit, comprising: a first memory cell and a second memory cell connected in parallel to each other, and a sense amplifier, the first memory cell comprising a first memristor and a first MOSFET selector connected in series, the second memory cell comprising a second memristor and a second MOSFET selector connected in series, respective terminals of the first memristor and the second memristor being grounded, parallel-connection terminals of the first MOSFET selector and the second MOSFET selector being connected to a first input terminal of the sense amplifier, a second input terminal of the sense amplifier being connected to a reference signal, positive-phase and negative-phase output voltage signals of the sense amplifier being a logic operation result, resistance states of the first memristor and the second memristor representing a first group of logic input signals, and voltage signals applied by gates of the first MOSFET selector and the second MOSFET selector representing a second group of logic input signals, wherein a first input signal A is used to represent the resistance state $Din_1(A)$ of the first memristor, and an inversion signal $\overline{A}$ of the first input signal A is used as the resistance state $Din_1'(\overline{A})$ of the second memristor; a second input signal B being used to represent the voltage signal $Din_2'(B)$ applied by the gate of the second MOSFET selector, a voltage signal applied by a gate terminal $WL_0$ of the first MOSFET selector being set to a high level $Din_2$; and the sense amplifier generating "OR" and "NOR" logic operation results, or wherein the first input signal A is used to represent the resistance state $Din_1(A)$ of the first memristor, and the inversion signal $\overline{A}$ of the first input signal A is used as the resistance state $Din_1(\overline{A})$ of the second memristor; the second input signal B being used to represent the voltage signal $Din_2(B)$ applied by the gate of the first MOSFET selector, the voltage signal applied by the gate of the second MOSFET selector being set to a low level $Din_2(0)$; and the sense amplifier generating "AND" and "NAND" logic operation results.

12. A memristor-based in-memory logic computation system, comprising at least one in-memory logic circuit according to claim 11.

13. The in-memory logic computation system according to claim 12, further comprising: a Word-Line decoder and driver circuit, a Source-Line decoder, selectors, and driver circuits, a Bit-Line decoder, selectors, and driver circuits, and a system controller, Memristor-based Computing-in-Memory cells forming an array structure, respective terminals of memristor-based Computing-in-Memory cells in the same column being connected to the Bit-Line decoder, selectors, and driver circuits by means of a Bit-Line, respective other terminals being connected to the Source-Line decoder, selectors, and driver circuits by means of a Source-Line, and being connected to the first input terminal of the sense amplifier by means of the Source-Line decoder, selectors, and driver circuits, and memristor-based Computing-in-Memory cells in the same row being connected to the Word-Line decoder and driver circuit by means of a word-line, wherein the memristor-based computing-in-memory cell is the first memory cell and the second memory cell connected in parallel to each other, the system controller respectively controlling the Word-Line decoder and driver circuit, the Source-Line decoder, selectors, and driver circuits, and the Bit-Line decoder, selectors, and driver circuits.

14. The in-memory logic computation system according to claim 13, wherein the array structure formed by the memristor-based Computing-in-Memory cells is a two-transistor two-memristor (2T2R) array structure, or an array structure formed by parallel connection of two sets each comprising one transistor and one memristor (1T1R).

15. A Computing-in-Memory hardware accelerator for a neural network application, for protecting weight data in the neural network, comprising the in-memory logic computation system according to claim 12.

* * * * *